United States Patent Office 3,386,966
Patented June 4, 1968

3,386,966
FULLY CONJUGATED ALICYCLIC POLYMERS AND PROCESS OF MAKING SAME
Hartwig C. Bach, Durham, N.C., assignor to Monsanto Company, St. Louis, Mo., a corporation of Delaware
No Drawing. Filed Nov. 23, 1964, Ser. No. 413,314
18 Claims. (Cl. 260—78)

ABSTRACT OF THE DISCLOSURE

Fully conjugated alicyclic polymers containing carbon to carbon double bonds are prepared by oxidative coupling of the two methylene groups of four member cyclic ring monomers which contain carbonyl and nitrogen ring members in addition to the methylene groups. These polymers have high thermal resistance and are useful as insulators.

---

The reaction involving the formation of carbon-carbon bonds by oxidation of activated methylene groups is a well known reaction which has been applied to the synthesis of indigo dyes. It has now been found that this reaction may be used to prepare fully conjugated alicyclic polymers.

Accordingly, it is an object of this invention to provide new compositions of matter and a process for their preparation.

Another object of the invention is to provide fully conjugated alicyclic polymers prepared by the formation of carbon-carbon bonds.

Another object of the invention is to provide a novel process for the preparation of high molecular weight fully conjugated alicyclic polymers which involves the formation of carbon-carbon bonds by oxidation of activated methylene groups.

Still another object of the invention is to provide a new class of polymers which are especially useful in high thermal resistance applications.

These and other objects of the invention are generally accomplished by the preparation and provision of new compositions of matter which are referred to as fully conjugated alicyclic polymers presumably having the general formula

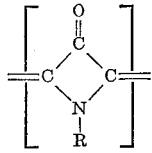

wherein R represents hydrogen, lower alkyl, or aryl.

In general the preparation of the fully conjugated alicyclic polymers of this invention involves the preparation of an oxidizable cyclic monomer to which is applied an oxidative coupling polymerization step which induces polymerization by oxidative coupling of the methylene groups of the cyclic monomer.

The cyclic monomer, which is assumed to have the structural formula

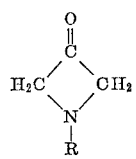

wherein R is hydrogen, alkyl, or aryl, is prepared by reacting a suitable iminodiacetic acid or its salt with an acid anhydride-acid salt combination, which induces the four member cyclic ring formation, and by subsequent hydrolysis. Iminodiacetic acids such as iminodiacetic acid and N-substituted iminodiacetic acids such as N-methyl-iminodiacetic acid may be used. These acids are preferably employed in the form of the disodium or dipotassium salt with an acid anhydride only. Suitable acid anhydride-acid salt combinations are acetic anhydride and sodium acetate, acetic anhydride and potassium acetate, propionic anhydride and sodium propionate, propionic anhydride and potassium propionate, acetic anhydride and sodium propionate, butyric anhydride and sodium butyrate, butyric anhydride and potassium acetate, valeric anhydride and sodium butyrate, lauric anhydride and sodium laurate and others of the fatty acid group through 12 carbon acids. The resulting product is hydrolyzed with HCl or other suitable hydrolysis reagents to form the cyclic monomer or its salt.

The cyclic monomer is induced to undergo the oxidative coupling reaction by being subjected to the action of air, molecular oxygen or any other oxidizing agents such as peroxy compounds, particularly hydrogen peroxide and the like in the presence of a basic medium at room temperature until the polymerization reaction is substantially complete and the product is isolated by changing the medium from basic to acidic.

The amount of oxidant employed in order to obtain the highest yield of desired product should be no more than the theoretically predicted amount. Using a large excess of oxidant leads to decoloration of the mixture and no polymer. Optimum conditions for oxidation are a buffered, slightly basic medium.

The reaction sequence for the preparation of the intermediates and polymers of the invention is believed to include by way of illustration the following reaction steps:

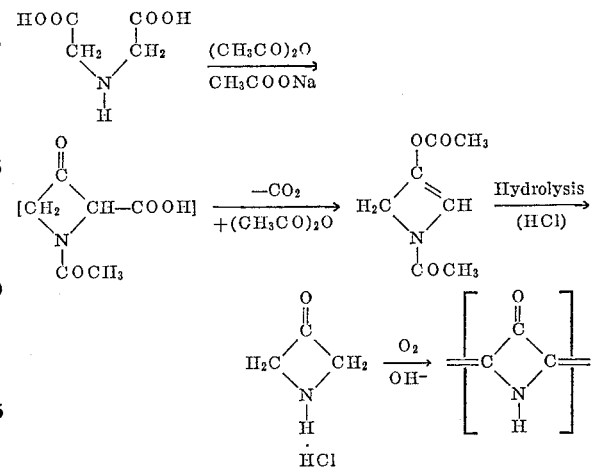

It has been found that the oxidative coupling reaction only occurs in a basic medium. The reaction rate seems to be dependent on the basicity of the medium. This fact indicates that the first step of the reaction involves the elimination of a proton from the reactive site probably as follows:

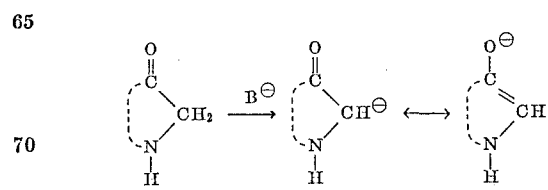

The anion formed is then oxidized by molecular oxygen or other oxidizing agents to form a reactive intermediate which couples with another intermediate of the same composition to establish a carbon-carbon double bond. This oxidation reaction of the cyclic monomer and the subsequent coupling is conducted only in a basic medium. Furthermore, a strongly basic medium such as 2 N sodium hydroxide and similar inorganic bases can cause oxidative degradation of the polymer during polymerization thus preventing the preparation of polymer of high molecular weight. Therefore, a weakly basic organic medium such as dimethylacetamide or dimethylacetamide/sodium acetate is preferred in order for the formation of high molecular polymer to occur. Such a medium is apparently basic enough to initiate oxidative polymerization but too weakly basic to facilitate oxidative degradation of the formed polymer. Thus, preferred conditions for the oxidative polymerization include a weakly basic medium which may be selected from inorganic bases derived from Groups IA & IIA of the Mendeleeff Periodic Table, organic bases and mixtures thereof.

The polymers of this invention are useful in a wide range of applications. Their polymerization is fairly uncomplicated and is featured furthermore by the fact that the presence of impurities apparently does not prevent the formation of high molecular weight polymer. The reason for this indifference of molecular weight to impurities is thought to be that only methylene groups flanked by free imino- and keto-groups can undergo oxidative coupling. Thus, only the ring closed hydrolyzed compounds are bifunctionally oxidizable and thus polymerizable. These polymers show high resistance to all forms of thermal degradation with some polymer forms retaining their characteristics up to 600° C.

A typical polymer, believed to be poly(azacyclobutan-3-one),

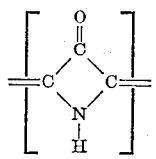

is obtained in dark brown to black solids not melting upon heating to approximately 600° C. Chain molecules of the polymer are apparently strongly associated in solution as evidenced by an abnormal increase of viscosity with concentration. Solubility is good with 32 percent solutions of low to medium molecular weight polymer in dimethylacetamide containing a small amount of lithium chloride being easily obtained. The polymer can be dissolved in dimethylsulfoxide, concentrated sulfuric acid and hexamethylphosphoramide although dimethylacetamide containing lithium chloride is preferred. These conjugated polymers do not indicate any sharp melting point by DTA analysis up to 1000° C. in $N_2$. A TGA analysis diagram from 25 to 800° C. in $N_2$ shows a gradual weight loss of 43.4 percent from 180 to 700° C. Part of this weight loss is probably due to loss of hard to remove solvent. The presence of dimethylacetamide in off gases was noted.

An additional surprising feature of this conjugated polymer, believed to be poly (azacyclobutan-3-one), is the fact that it is an insulator as indicated by a resistivity at 20° C. of $2.5 \times 10^{18}$ ohms per centimeter in spite of the apparently high degree of conjugation.

The invention is further illustrated by the following examples in which all parts and percentages are by weight unless otherwise indicated.

Example I

A 180 ml. portion of acetic anhydride was refluxed for ½ hour with nitrogen bubbling through the liquid. After cooling to about 30° C., iminodiacetic acid disodium salt monohydrate in a 30 gram portion was added and the mixture was refluxed for 6 hours under a nitrogen blanket. A vigorous $CO_2$ evolution was observed. Then a stream of dried HCl gas was passed through the cooling mixture for 45 minutes after which it was evaporated in vacuo. The residue was heated with 125 ml. of ethanol and the suspension was filtered while hot and the filtrate poured into 350 ml. of water. A brown precipitate, 10.3 grams, having a melting point of 187° C. to 193° C. was obtained by filtration. This product is believed to be N-acetyl-3-acetoxy-azacyclobut-2-ene which has the structural formula as indicated by IR-spectrum as follows:

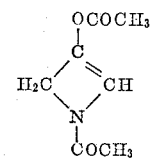

Example II

A 5 gram portion of the product of Example I was refluxed with 100 ml. of aqueous 5 percent HCl under a nitrogen blanket for 2 hours. Then a dark brown crystalline compound was filtered off. This compound was obtained in a yield of 2.42 grams and had a melting point of 290 to 300° C. This product is believed to be azacyclobutan-3-one-hydrochloride, and to have the following formula

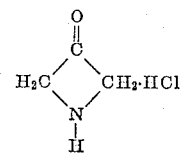

Example III

In this example polymer is prepared presumed to have the structural formula

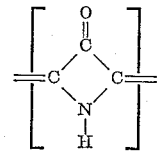

A 3.0 gram portion of the product of Example I was heated with 45 ml. of 4 N sodium hydroxide for 30 minutes under a nitrogen blanket. The dark solution was cooled to room temperature, 45 ml. of water was added and the mixture oxidized at 80° C. in a closed system with pure oxygen under atmospheric pressure. During 5 hours 416 ml. of oxygen was absorbed by the mixture. The mixture was then acidified by concentrated HCl and 1.39 grams of a dark brown material having a melting point greater than 400° C. was collected by filtration. The inherent viscosity of the polymer as measured in a 0.5 percent solution in dimethylacetamide containing 5 percent dissolved lithium chloride was 0.079. The starting material, iminodiacetic acid disodium salt monohydrate dide not absorb oxygen when similarly treated.

Example IV

A mixture of 2.0 grams of product of Example II, 0.782 gram of lithium hydroxide, 1 gram of anhydrous Na acetate and 30 ml. of dimethylacetamide containing 5 percent LiCl was refluxed for 17 hours. The suspension was then poured into 200 ml. of 5 percent HCl. A black product weighing 1.2 grams was obtained which did not melt on heating to 420° C. The inherent viscosity of the product was 0.52 as measured in a 0.5 percent solution of product in dimethylacetamide containing 10 percent dissolved LiCl.

Example V

A 1.0 gram portion of product of Example II was dissolved in 30 ml. of 2 N sodium hydroxide. The resulting solution absorbed 161.4 ml. of oxygen in 5 hours and 20 minutes at 75° C.–80° C. By acidification 0.23 gram of a dark brown material was obtained which did not melt upon heating to 410° C.

Example VI

A 2 gram portion of product of Example II and 0.782 gram of lithium hydroxide (oven dried) were refluxed in 10 ml. dimethylacetamide for 6 hours with a slow stream of air being passed into the reflux condenser. After the addition of 5 ml. of dimethylacetamide the mixture was added to 100 ml. of 5 percent HCl. An almost black material (1.6 grams) was obtained which did not melt on heating to 410° C. The inherent viscosity of this compound as measured in a 0.5 percent solution in dimethylacetamide containing 5 percent lithium chloride at 25° C. was 0.106.

Example VII

To a solution of 2 grams of product of Example II in 30 ml. of 2 N sodium hydroxide was added 42.15 ml. of 3 percent aqueous hydrogen peroxide at 25° C. in 15 minutes under $N_2$. Then the mixture was acidified by concentrated HCl. About 1.07 grams of an almost black material not melting on heating to 410° C. was obtained by filtration.

As many widely different embodiments of this invention may be made without departing from the spirit and scope thereof, it is to be understood that the invention is not to be limited by the specific embodiments set forth herein but only by the claims which follow.

I claim:
1. A process for the preparation of fully conjugated alicyclic polymers comprising the steps of:
   (1) mixing an iminodiacetic acid salt with an acid anhydride-acid salt to form a cyclic monomer;
   (2) contacting the cyclic monomer with a hydrolysis agent;
   (3) and bringing together the cyclic monomer and an oxidizing agent in a basic medium to form the fully conjugated alicyclic polymers.

2. The process of claim 1 wherein the iminodiacetic acid salt is iminodiacetic acid disodium salt monohydrate.
3. The process of claim 1 wherein the iminodiacetic acid salt is an N-substituted iminodiacetic acid salt.
4. The process of claim 1 wherein the acid anhydride-acid salt is acetic anhydride-sodium acetate.
5. The process of claim 1 wherein the acid anhydride-acid salt is acetic anhydride-potassium acetate.
6. The process of claim 1 wherein the acid anhydride-acid salt is acetic anhydride-sodium propionate.
7. The process of claim 1 wherein the acid anhydride-acid salt is propionic anhydride-sodium propionate.
8. The process of claim 1 wherein the acid anhydride-acid salt is butyric anhydride-sodium butyrate.
9. The process of claim 1 wherein the hydrolysis agent is HCl.
10. The process of claim 1 wherein the hydrolysis agent is 4 N NaOH.
11. The process of claim 1 wherein the oxidizing agent is molecular oxygen.
12. The process of claim 1 wherein the oxidizing agent is hydrogen peroxide.
13. The process of claim 1 wherein the basic medium consists of 2 N sodium hydroxide.
14. The process of claim 1 wherein the basic medium consists of dimethylacetamide.
15. The process of claim 1 wherein the basic medium consists of dimethylacetamide and sodium acetate.
16. The process of claim 1 wherein the basic medium is selected from the group consisting of inorganic bases derived from Groups IA and IIA of the Mendeleeff Periodic Table, and organic bases, and mixtures thereof.
17. A new composition of matter consisting essentially of the polymeric reaction product obtained by the process of claim 1.
18. A new composition of matter consisting essentially of the polymeric reaction product obtained by mixing iminodiacetic acid disodium salt monohydrate with acetic anhydride-sodium acetate to form a cyclic monomer, contacting the cyclic monomer with a hydrolysis agent comprising HCl, and bringing together the cyclic monomer and molecular oxygen in a basic medium consisting of dimethylacetamide and sodium acetate.

References Cited

UNITED STATES PATENTS

| | | | |
|---|---|---|---|
| 2,502,548 | 4/1950 | Allen et al. | 260—78 |
| 2,895,948 | 7/1959 | Brinker et al. | 260—78 |

WILLIAM H. SHORT, *Primary Examiner.*

SAMUEL H. BLECH, *Examiner.*

H. D. ANDERSON, *Assistant Examiner.*